United States Patent [19]

Kinoshita et al.

[11] Patent Number: 5,633,769
[45] Date of Patent: May 27, 1997

[54] MAGNETIC DISC DRIVE DEVICE

[75] Inventors: Shinji Kinoshita; Mitsuru Ide; Toru Kumagai, all of Nagano, Japan

[73] Assignee: Kabushiki Kaisha Sankyo Seiki Seisakusho, Nagano, Japan

[21] Appl. No.: 439,220

[22] Filed: May 11, 1995

[30] Foreign Application Priority Data

| May 11, 1994 | [JP] | Japan | 6-123125 |
| May 11, 1994 | [JP] | Japan | 6-123126 |
| May 12, 1994 | [JP] | Japan | 6-123104 |

[51] Int. Cl.$^6$ ...................................... G11B 19/20
[52] U.S. Cl. ...................... 360/99.08; 360/98.07; 360/99.04
[58] Field of Search ............... 360/99.08, 99.04, 360/98.07

[56] References Cited

U.S. PATENT DOCUMENTS

| 3,019,066 | 3/1962 | Decker | 308/187.1 |
| 3,978,801 | 9/1976 | Forte | 112/176 |
| 4,824,122 | 4/1989 | Raj et al. | 277/80 |
| 4,827,168 | 5/1989 | Nakajima | 310/90 |
| 4,898,480 | 2/1990 | Raj et al. | 384/446 |
| 4,907,897 | 3/1990 | Shirotori | 384/446 |
| 5,305,163 | 4/1994 | Holm | 360/98.07 X |
| 5,411,338 | 5/1995 | Goto | 384/537 |
| 5,426,548 | 6/1995 | Fujii et al. | 360/99.12 X |
| 5,457,588 | 10/1995 | Hattori et al. | 360/98.07 X |

FOREIGN PATENT DOCUMENTS

| 3805075A1 | 9/1988 | Germany . | |
| 422297 | 4/1992 | Japan | G11B 19/20 |
| 533653 | 4/1993 | Japan | H02K 3/34 |
| 533654 | 4/1993 | Japan | H02K 3/34 |
| 62980 | 1/1994 | Japan | H02K 29/00 |
| 7-111024 | 4/1995 | Japan . | |

*Primary Examiner*—John H. Wolff
*Attorney, Agent, or Firm*—Sughrue, Mion, Zinn, Macpeak & Seas

[57] ABSTRACT

A magnetic disc drive device includes a labyrinth structure proximate to the ball bearings to effectively prevent scattering of particles. The labyrinth structures are formed by various arrangements where complicated passages are defined by elements arranged proximate to the inner ring and the outer ring of a ball bearing. One of the elements forming the passages being either the hub or the frame of the magnetic disc drive device.

16 Claims, 10 Drawing Sheets

FIG. 3

NUMBER OF DUST PARTICLES

[NUMBER OF DUST]

| | | TEST NUMBER NO. | 1 | 2 | 3 | 4 | 5 | TOTAL |
|---|---|---|---|---|---|---|---|---|
| LABYRINTH STRUCTURE AT OUTER CIRCUMFERENTIAL OF BEARING | NOT PROVIDED | 1 | 66 | 53 | 50 | 40 | 45 | 254 |
| | | 2 | 43 | 129 | 15 | 10 | 13 | 210 |
| | | 3 | 57 | 30 | 19 | 15 | 10 | 131 |
| | | 4 | 24 | 5 | 13 | 10 | 5 | 57 |
| | | 5 | 44 | 14 | 10 | 5 | 5 | 78 |
| | PROVIDED | 1 | 1 | 0 | 0 | 1 | 0 | 2 |
| | | 2 | 1 | 0 | 0 | 0 | 0 | 1 |
| | | 3 | 0 | 0 | 2 | 0 | 0 | 2 |
| | | 4 | 0 | 0 | 0 | 0 | 0 | 0 |
| | | 5 | 0 | 1 | 0 | 0 | 0 | 1 |

FIG. 13

CONDITION  0.01cf/min  10min
0.1, 0.3, 0.5 MICRON PARTICLE
IN DRIVE WITH DISKS SPEED 4500rpm                    [PCS]

| CONDI. [TEMP.] | | RUBBER BEARING SEAL | | | | STEEL BEARING SEAL | | | |
|---|---|---|---|---|---|---|---|---|---|
| MOTOR No. | | 1 | 2 | 3 | 4 | 1 | 2 | 3 | 4 |
| 1st 1min | 0.1 μm | 0 | 1 | 3 | 1 | 8 | 7 | 5 | 9 |
|  | 0.3 μm | 0 | 1 | 0 | 0 | 6 | 5 | 3 | 5 |
|  | 0.5 μm | 0 | 0 | 0 | 0 | 0 | 0 | 0 | 0 |
| 2nd 1min | 0.1 μm | 1 | 3 | 2 | 1 | 12 | 13 | 13 | 9 |
|  | 0.3 μm | 0 | 0 | 0 | 1 | 6 | 5 | 6 | 3 |
|  | 0.5 μm | 0 | 0 | 0 | 0 | 2 | 1 | 1 | 0 |
| 3rd 1min | 0.1 μm | 0 | 2 | 0 | 2 | 10 | 11 | 12 | 6 |
|  | 0.3 μm | 0 | 1 | 0 | 0 | 3 | 8 | 7 | 1 |
|  | 0.5 μm | 0 | 1 | 0 | 0 | 0 | 0 | 0 | 0 |
| 4th 1min | 0.1 μm | 2 | 1 | 1 | 2 | 5 | 7 | 11 | 8 |
|  | 0.3 μm | 0 | 0 | 0 | 0 | 2 | 5 | 2 | 1 |
|  | 0.5 μm | 0 | 0 | 0 | 0 | 0 | 0 | 0 | 0 |
| 5th 1min | 0.1 μm | 2 | 1 | 3 | 1 | 2 | 4 | 2 | 1 |
|  | 0.3 μm | 0 | 0 | 1 | 0 | 1 | 0 | 0 | 0 |
|  | 0.5 μm | 0 | 0 | 1 | 0 | 0 | 0 | 0 | 0 |
| 6th 1min | 0.1 μm | 3 | 1 | 9 | 2 | 2 | 1 | 2 | 2 |
|  | 0.3 μm | 0 | 0 | 4 | 1 | 0 | 1 | 0 | 0 |
|  | 0.5 μm | 0 | 0 | 4 | 0 | 0 | 0 | 0 | 0 |
| 7th 1min | 0.1 μm | 1 | 0 | 0 | 2 | 3 | 2 | 0 | 6 |
|  | 0.3 μm | 0 | 0 | 0 | 0 | 2 | 1 | 0 | 1 |
|  | 0.5 μm | 0 | 0 | 0 | 0 | 0 | 0 | 0 | 0 |
| 8th 1min | 0.1 μm | 0 | 2 | 3 | 3 | 12 | 8 | 1 | 1 |
|  | 0.3 μm | 0 | 0 | 0 | 0 | 0 | 0 | 0 | 0 |
|  | 0.5 μm | 0 | 0 | 0 | 0 | 3 | 0 | 0 | 0 |
| 9th 1min | 0.1 μm | 4 | 2 | 2 | 2 | 0 | 0 | 0 | 2 |
|  | 0.3 μm | 0 | 1 | 0 | 0 | 0 | 0 | 0 | 0 |
|  | 0.5 μm | 0 | 1 | 0 | 0 | 0 | 0 | 0 | 0 |
| 10th 1min | 0.1 μm | 3 | 2 | 1 | 0 | 2 | 4 | 1 | 2 |
|  | 0.3 μm | 0 | 0 | 0 | 0 | 0 | 1 | 0 | 2 |
|  | 0.5 μm | 0 | 0 | 0 | 0 | 0 | 0 | 0 | 0 |
| TOTAL | 0.1 μm | 16 | 15 | 24 | 16 | 56 | 57 | 47 | 46 |
|  | 0.3 μm | 0 | 3 | 5 | 2 | 20 | 26 | 18 | 14 |
|  | 0.5 μm | 2 | 2 | 5 | 0 | 5 | 1 | 1 | 0 |

MAGNETIC DISC DRIVE DEVICE

BACKGROUND OF THE INVENTION

1. Field of the Invention

The present invention relates to a magnetic disc drive device, and more particularly to a labyrinth structure formed in a passage connecting the inside of a ball bearing as a bearing to the outside thereof.

2. Related art

In a magnetic disc drive device, a ball bearing is used for rotatably supporting the hub which holds a magnetic disc.

In some types of the magnetic disc drive devices, a labyrinth structure is formed in a passage connecting the inside of a ball bearing as a bearing to the outside thereof. The labyrinth structure blocks the flow of dust particles, such as oil mist, generated in the ball bearing, toward a magnetic disc held by the hub.

FIGS. 8 and 9 show the structures of conventional magnetic disc drive devices.

In FIG. 8, a frame 71 has a cylindrical part 71a at the central part. A shaft 72 is forcibly applied and fixed to the cylindrical part 71a of the frame. A stator core 73 is fastened to the outer side of the cylindrical part 71a.

The stator core 73 is provided with a plural number of protruded poles. A drive coil 74 is wound, by a preset number of turns, on the protruded poles of the stator core.

The inner rings of the ball bearings 75 and 76 are fastened to the shaft 72 extended from and above the frame 71. A hub 77 is forcibly put into and fixed to the ball bearings 75 and 76. The hub 77 is rotatably supported.

The hub 77 includes a cylindrical outer surface 82 and a flange portion 81 continuous to the outer surface 82. A magnetic disc is put on the flange portion 81, through the outer surface 82, and clamped thereon by a clamper fastened to the hub 77. In this state, the magnetic disc is rotatable together with the hub 77.

The underside of the flange portion 81 includes a side wall 81a. A ring-like drive magnet 79 is fastened to the inner side of the side wall 81a.

The inner surface of the drive magnet 79 faces the tops of the protruded poles of the stator core 73 in a state that a proper gap is present therebetween.

With this structure, when current fed to the drive coil 74 is switched depending on an angular position of the drive magnet 79, the hub 77 and the magnetic disc held by the hub 77 are turned at a predetermined speed.

Another small side wall 86, which is integral with the hub 77, is disposed around the side wall 81a of the hub 77, thereby forming a groove 83 shaped arcuate about the axial line of the shaft 72.

A flange 88 is formed on the outer surface of the frame 71. A raised part 84, which is arcuate about the axial line of the shaft 72, is formed inside the flange 88. The raised part 84 is inserted into the groove 83 with a gap therebetween, thereby forming a labyrinth structure.

The outer surface of the side wall 86 is disposed facing the inner side 85 of the cylindrical side wall of the frame 71, while being properly spaced from each other.

Reference numeral 94 designates a flexible board electrically connected to an external circuit.

In the conventional magnetic disc drive device of FIG. 8, as described above, the raised part 84 of the frame 71 is fit into the groove 83 of the hub 77, thereby forming a labyrinth structure.

The outer side of the small side wall 86 of the hub 77 is disposed facing the inner side 85 of the cylindrical side wall of the frame 71 while being properly spaced from each other, thereby forming a labyrinth structure.

The dust particles, such as oil mist, generated in the ball bearings 75 and 76 are shut off by the labyrinth structure, and do not reach the magnetic disc.

The opening of the upper end of the hub 77 is covered with a cap 80. By the cap, dust particles, which are generated by the ball bearings 5 and 6, are prevented from going outside through the top end opening of the hub 77.

The conventional magnetic disc drive device shown in FIG. 9 will be described.

The differences of the FIG. 9 device from the FIG. 8 device are:

1) The fixed shaft is integral with the frame 71.
2) The ring-like drive magnet 79 is fastened to the inner side of the side wall 90 of the hub 77, with the yoke 78 inserted therebetween.
3) The outer side of the side wall 90 of the hub 77 is disposed facing the inner side of the side wall 91 of the frame 71, while being spaced a gap G1 from each other. A stepped part 93, which is formed in the inner side of the side wall 91 of the frame 71, faces the lower end face of the side wall 90 of the hub 77, thereby forming a labyrinth structure.

The remaining structure of the FIG. 9 device is substantially the same as that of the FIG. 8 device. Hence, the same or equivalent portions are designated by the same reference numerals as FIG. 8.

Also in the device of FIG. 9, the outer side of the side wall 90 of the hub 77 is disposed facing the inner side of the side wall 91 of the frame 71 while being spaced the gap G1, thereby forming the labyrinth structure. The dust particles, such as oil mist, generated in the ball bearings 75 and 76 are shut off by the labyrinth structure, and do not reach the hard disc.

Another labyrinth structure is disclosed in Published Unexamined Japanese Patent Application No. Hei. 4-22297. In the publication, a seal member is attached to the end of the ball bearing as viewed in the axial direction. A contact member is disposed covering a part of the seal member. A gap formed between the seal member and the contact member, thus arranged, forms a labyrinth structure.

In each of the conventional magnetic disc drive devices of FIGS. 8 and 9, the labyrinth structure is formed in the outer portion of the hub. The devices have the following problems.

In the magnetic disc drive device of FIG. 8, the groove and the raised part must be formed in the outer portion of the hub. This makes the shape thereof complicated and hence increases the machining cost.

In the magnetic disc drive device of FIG. 9, the gap G1 between the hub and the frame is set to be as small as possible (preferably 0.1 mm or shorter).

To realize such a gap, the hub and the frame must be precisely machined. An error caused when the ball bearing and the hub are mounted makes the hub unsteady. Accordingly, the gap between the hub and the frame must be determined allowing for the unsteadiness of the hub. This necessitates a relatively large gap. The resultant labyrinth structure has an insufficient dust shut-off function.

The labyrinth structure disclosed in Published Unexamined Japanese Patent Application No. Hei. 4-22297, is constructed by using the seal member provided at the end of the bearing and the contact member disposed facing the seal member while covering a part of the latter. The dust shut-off effect by such a labyrinth structure is unsatisfactory.

SUMMARY OF THE INVENTION

With the view of overcoming the disadvantages of the conventional art, an object of the present invention is to provide a magnetic disc drive device advantageously improved in that the parts dimension control is easy, machining cost is low, the gaps of the labyrinth structure are small, and the improved dust shut-off effect is obtained.

According to an aspect of the present invention, there is provided a magnetic disc drive device comprising: a shaft; a frame; a hub for holding a magnetic disc; a bearing for rotatably supporting the hub, an inner ring of the bearing fixed on said shaft; an opposed member facing an outer surface of an outer ring of the bearing with a gap present therebetween, the gap defined in the middle of a passage connecting the inside of the bearing to the outside thereof, the gap having a labyrinth function.

According to the present invention, a member (referred to as an opposed member) is disposed facing the outer surface of the outer ring of a ball bearing in a state that a gap is present therebetween. The gap forms a complicatedly bent passage in the middle of the space, thereby forming a labyrinth structure. When the ball bearing is turned together with the hub, a negative pressure is created in the passage of the labyrinth structure. In this state, the labyrinth structure serves as an air curtain for effectively preventing dust particles, such as oil mist, generated in the ball bearing, from being scattered. The number of dust particles scattered to stick to the magnetic disc is remarkably reduced. The outer surface of the ball bearing is finished with a high precision from the first. Accordingly, high precision machining is required for only the inner surface of the member, which faces the outer surface of the ball bearing. As a result, the machining cost is reduced.

In the present invention, a part of the opposed member is disposed facing the end face of the ball bearing as viewed in the axial direction or the seal member in a state that a gap is present therebetween. The scattering of dust particles can effectively be prevented.

The cylindrical part of the frame or the hub is used as the opposed member. There is no need of using additional separate parts for the opposed member. Accordingly, the number of required parts can be reduced.

The adhesive reservoir is formed between the inner surface of the stator core fit and fixed to the base of the frame and the outer surface of the cylindrical part. The outer surface of the cylindrical part for the adhesive reservoir has the straight part raised in the axial direction. The straight part blocks overflown adhesive from moving to attach to the ball bearing and the hub.

The rubber seal members are compressively attached to the inner side of the outer ring of the ball bearing. A part of each one of the rubber seal members, after being attached, will restore to its original state by its elasticity. Accordingly, an airtight attachment of the seal member is ensured. The generated dust particles are confined within the ball bearing. In other words, the dust particles generated in the ball bearing are prevented from being scattered outside in an inexpensive manner.

BRIEF DESCRIPTION OF THE DRAWINGS

FIG. 3 is table showing the results of measuring the numbers of dust particles discharged from the magnetic disc drive device of the invention and the conventional one;

FIG. 13 is a table comparatively showing the results of measuring the numbers of dust particles discharged from the magnetic disc drive device of the invention (seventh embodiment) which uses a rubber bearing seal member, and the conventional one which uses an iron bearing seal member;

DETAILED DESCRIPTION OF THE PREFERRED EMBODIMENTS

1st embodiment

A first embodiment of a magnetic disc drive device according to the present invention will be described with reference to the accompanying drawings.

Figure 1:
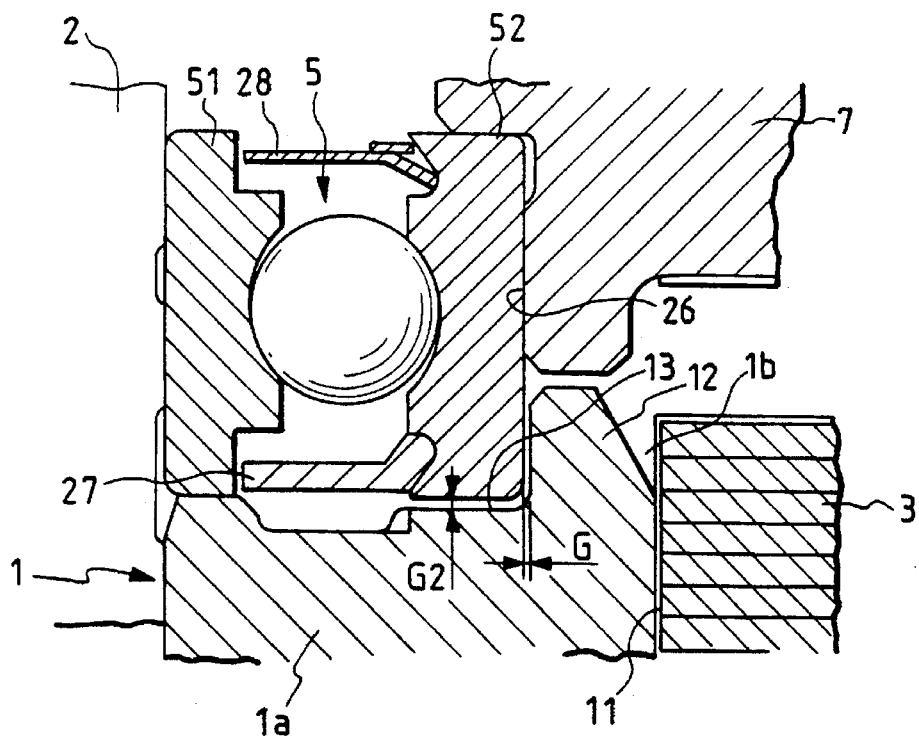
FIG. 1 is a front sectional view showing a major portion of a first embodiment of a magnetic disc drive device according to the present invention.
Figure 2:
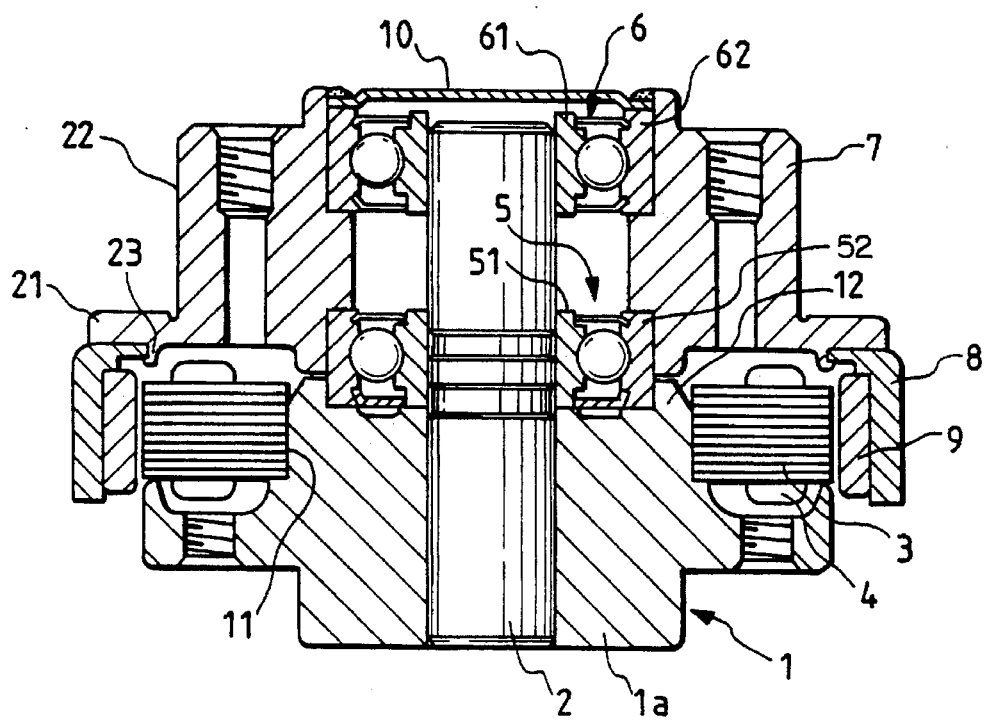
FIG. 2 is a front sectional view showing an overall construction of the first embodiment of FIG. 1.
Figure 4:
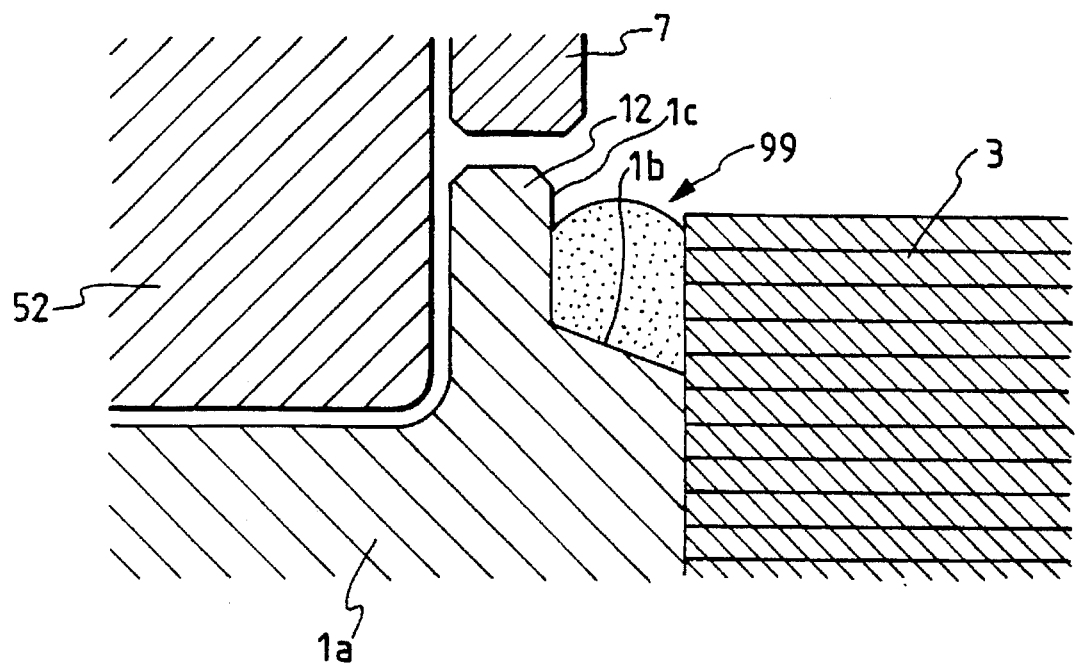
FIG. 4 is a front sectional view showing a major portion of a second embodiment of a magnetic disc drive device according to the present invention.

Referring to FIGS. 1 and 2, a hole is formed in a base 1a of a frame 1. A shaft 2 is press fit into the center hole of the frame 1.

A stator core 3 is fastened to a cylindrical part, which constitutes the upper outer portion of the base 1a.

The stator core 3 is formed of a plural number of laminated core elements. A plural number of poles are protruded from the outer surface of the stator core 3.

A drive coil 4 is wound, by a preset number of turns, on the protruded poles of the stator core 3.

The inner rings 51 and 61 of ball bearings 5 and 6 are fastened to the upper part of the shaft 2, which is extended from and above the frame 1.

The external rings 52 and 62 of the ball bearings 5 and 6 are forcibly put into a hub 7 and fastened to the inner surface of the hub 7. In this state, the hub 7 is rotatable about the shaft 2, with the ball bearings 5 and 6 inserted therebetween.

The hub 7 includes a flange portion 21 continuous to the outer surface 22. A magnetic disc (not shown) is put on the flange portion 21, through the outer surface 22, and clamped thereon by a clamper (not shown). In this state, the magnetic disc is rotatable together with the hub 7.

The underside of the flange portion 21 includes a caulking part 23. A yoke 8, substantially cylindrical in shape, includes a flange directed to the inner side. The flange is caulked by the caulking part 23 of the flange portion 21, to thereby fasten the yoke 8 to the hub 7.

A drive magnet 9, shaped like a ring, is fastened to the inner side of the yoke 8.

The inner surface of the drive magnet 9 faces the tops of the protruded poles of the stator core 3 in a state that a proper gap is present therebetween. With this structure, when current fed to the drive coil 4 is switched depending on an angular position of the drive magnet 9, the hub 7 and the magnetic disc held by the hub 7 are turned at a predetermined speed.

As best illustrated in FIG. 1, the lower bearing 5 of the ball bearings 5 and 6 is in close contact with the cylindrical inner surface 26 of a lower part of the hub 7. A lower part of the outer ring 52 is extended from and below the hub 7.

A cylindrical part 12 upwardly extends from the base 1a, along the outer surface of the outer ring 52 of the lower bearing 5.

The outer surface of the base 1a is cut to have a conical shape. The conical part of the cylindrical part 12 and the inner surface of the stator core 3 define an adhesive reservoir 1b.

The stator core 3 is fastened to the base 1a by adhesive when it fills up the adhesive reservoir 1b.

The inner surface of the cylindrical part 12 surrounds the outer surface of the lower part of the outer ring 52 of the lower bearing 5, with a minute space or gap G therebetween.

The minute space G is determined depending on the size of dust particles to be shut out. In the first embodiment, it is less than 0.3 mm in consideration of the practically tolerable size of the dust particles.

The cylindrical part 12 constitutes a member located in opposition to the outer ring 52. The minute space G is located in the middle of a space connecting the inner side of the lower bearing 5 to the outside thereof. The minute space G forms a complicatedly bent passage in the middle of the space, thereby forming a labyrinth structure.

Seal members 27 and 28 are attached to the outer ring 52 at both ends of the lower bearing 5 as viewed in the axial direction. With use of the seal members 27 and 28, oil mist and other dust particles generated within the lower bearing 5 to be discharged outside are reduced to the smallest possible amount.

Similar seal members are also attached to the ball bearings 6.

The frame 1 includes a surface 13 continuous to the cylindrical part 12. The surface 13, substantially at a right angle to the inner surface of the cylindrical part 12, is located facing the lower end of the lower bearing 5 with a minute space or gap G2 present therebetween, and also facing the seal member 27 of the lower bearing 5.

The minute space G2, larger than the minute space G, constitutes a part of the labyrinth structure.

The opening of the top end of the hub 7 is covered with a cap 10. By the cap, dust particles, which are generated by the ball bearings 5 and 6, are prevented from going outside through the top end opening of the hub 7.

As described above, the first embodiment employs the labyrinth structure constructed such that the cylindrical part 12 is formed as a part of the frame 1, and the cylindrical part 12 is disposed in opposition to the outer surface of the outer ring 52 of the lower bearing 5 with the minute space G located therebetween. When the outer ring 52 of the lower bearing 5 is turned together with the hub 7, the labyrinth structure serves as an air curtain for preventing oil mist and other dust particles, which are generated in the lower bearing 5, from being scattered outside the bearing.

With this unique structure, dust particles and the like, which will be scattered out of the ball bearings and attach to the magnetic disc held by the hub 7, are remarkably reduced.

In another labyrinth structure of the present embodiment, the surface 13 continuous to the cylindrical part 12 is located facing the lower end of the lower bearing 5 with a minute space or gap G2 present therebetween, and also facing the seal member 27 of the lower bearing 5. This labyrinth structure is capable of preventing dust particles from scattering into the outside of the ball bearing. Accordingly, this structure further reduces the dust particles scattered to attach to the magnetic disc.

Figure 8:
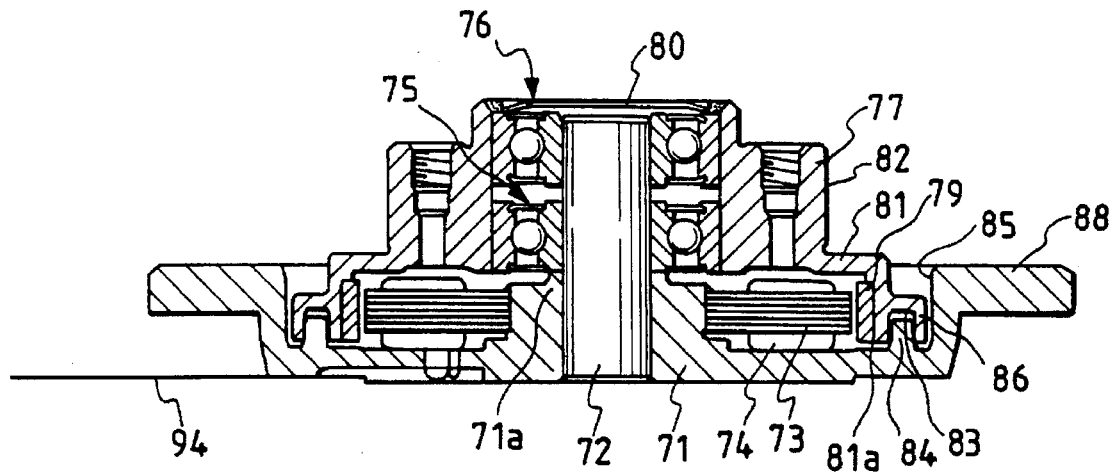
FIG. 8 is a front sectional view showing an example of a conventional magnetic disc drive device.
Figure 9:
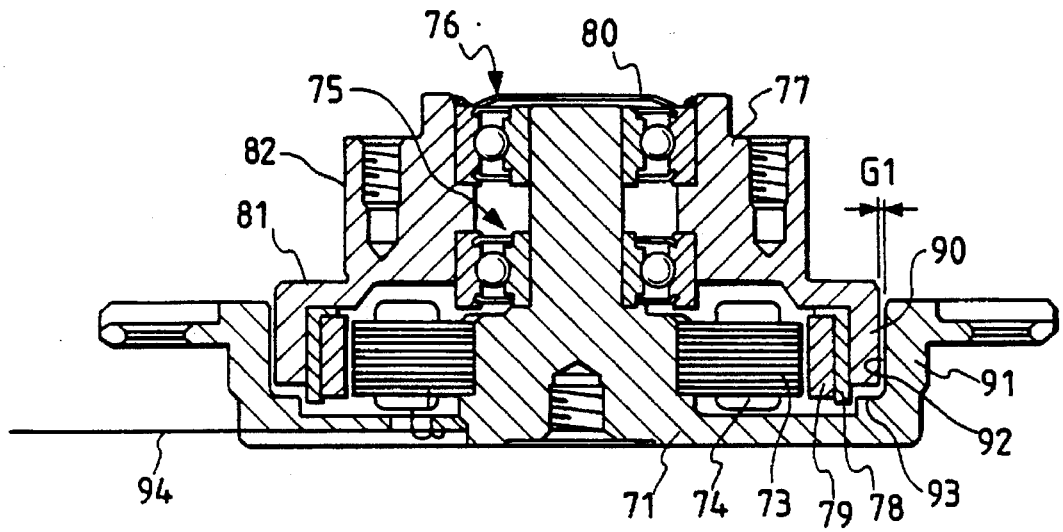
FIG. 9 is a front sectional view showing an example of another conventional magnetic disc drive device.

Measurements were conducted to confirm the dust scatter preventing effect in the first embodiment. Two magnetic disc drive devices as shown in FIGS. 8 and 9 were used. In each of the magnetic disc drive devices, only the peripheral portion of the hub is provided with the labyrinth structure, while in the magnetic disc drive device of the invention, the labyrinth structures are formed around and at the top and lower ends of the ball bearing. In the measurements, a number of scattered dust particles were measured.

The results of the measurement are shown in FIG. 3.

In the measurement, a magnetic disc was attached to the hub. A tube of a measuring instrument was disposed around the magnetic disc. Air was sucked into the instrument. A number of dust particles contained in the sucked air was counted by a counter.

As seen from FIG. 3 showing a table describing the results of the measurement, the magnetic disc drive device is remarkably improved over the conventional one in the dust scattering preventing effect.

The first embodiment shown in FIGS. 1 and 2 realizes reduction of the machining cost of the magnetic disc drive device in addition to the remarkable dust scatter preventing effect. The outer surface of the lower bearing 5 is finished with a high precision from the first, under the standards on the ball bearings. Accordingly, high precision machining is required for only the inner surface of the cylindrical part 12 of the frame 1, which faces the outer surface of the lower bearing 5. As a result, the machining cost is reduced in manufacturing the magnetic disc drive device. The labyrinth structure is free from mounting errors of the hub 7 and the lower bearing 5. Therefore, the gap (empty space) formed by the labyrinth structure may be reduced. This leads to enhancement of the dust scatter preventing effect.

When the stator core 3 is bonded to the frame 1, there is a case where adhesive overflows from the adhesive reservoir 1b and attaches to the members, such as the hub 7 and the lower bearing 5, which face the cylindrical part 12. In an extreme case, the overflown adhesive hinders the turn of the hub 7 and the lower bearing 5.

A measure to cope with this problem may be taken. A first measure taken in the embodiment is to modify the outer surface of the cylindrical part 12 to have a straight part 1c raised in the axial direction. The straight part 1c blocks overflown adhesive 99 from moving to attach to other members.

Figure 5:
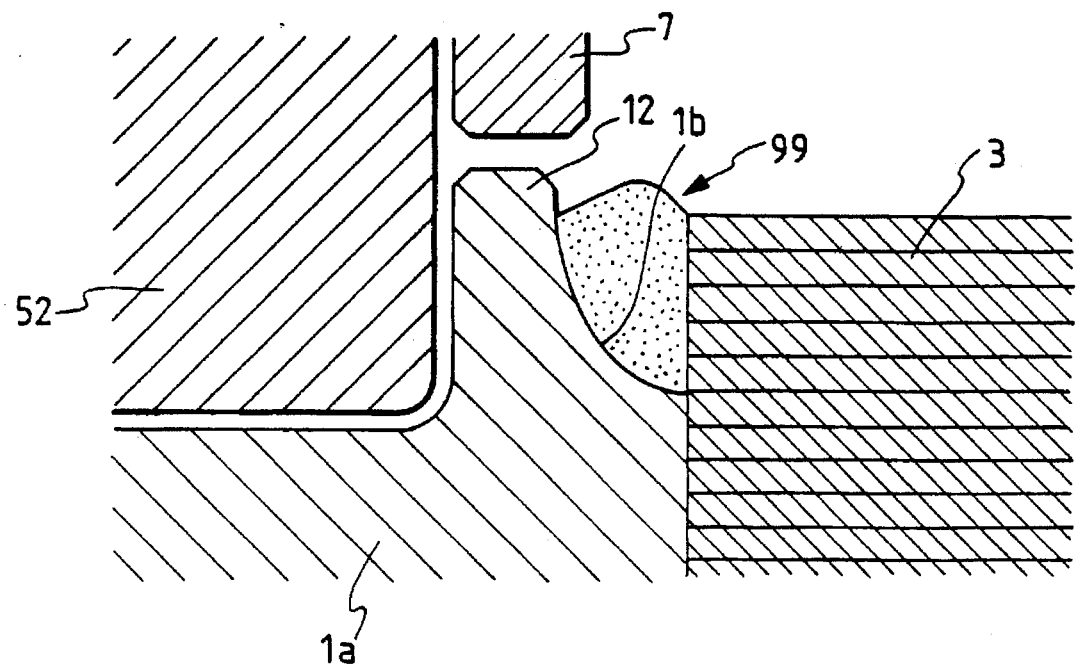
FIG. 5 is a front sectional view showing a major portion of a third embodiment of a magnetic disc drive device according to the present invention.

A second measure taken in the embodiment is to enlarge the adhesive reservoir 1b by more greatly beveling the outer surface of the cylindrical part 12 so as to prevent the overflown adhesive 99 from overflowing to other members, as shown in FIG. 5.

2nd Embodiment

A second embodiment of a magnetic disc drive device according to the present invention will be described with reference to FIG. 6.

Figure 6:
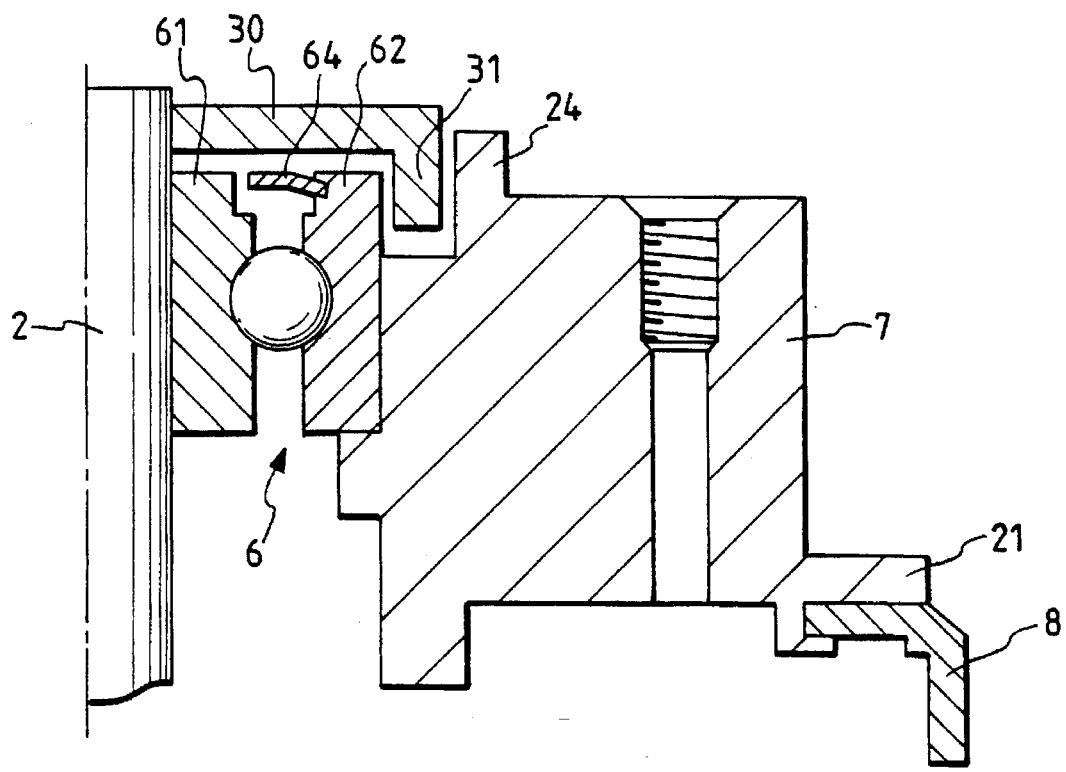
FIG. 6 is a front sectional view showing a major portion of a fourth embodiment of a magnetic disc drive device according to the present invention.

The second embodiment shown in FIG. 6 is constructed such that the portion of the cap 10 in the first embodiment shown in FIG. 2 is substituted by a labyrinth structure.

As shown in FIG. 6, a cap-like member 30 is forcibly put into and fixed to the upper end of the fixed shaft 2.

An upper part of the outer ring 62 of the ball bearing 6, which is forcibly put into the center hole of the hub 7, is extended above the center hole of the hub 7.

The inner wall of the outer wall 31 of the cap-like member 30 surrounds the outer surface of the upper part of the outer ring 62 of the ball bearing 6 while both being properly spaced from each other.

The outer surface of the outer wall 31 of the cap-like member 30 confronts with the inner surface of a cylindrical part 24, which is formed on the upper end of the hub 7, while both being properly spaced from each other.

A gap between the outer ring 62 of the ball bearing 6 and the outer wall 31 of the cap-like member 30 and a gap between the cylindrical part 24 of the hub 7 and the outer wall 31 of the cap-like member 30 are present in the middle of a space extending communicating the inside of the ball bearing 6 to the out side thereof, thereby forming a labyrinth structure.

A structure that the upper end face of the ball bearing 6 as viewed in the axial direction faces the cap-like member 30 while those being properly spaced from each other and another structure that the seal member 64 mounted on the ball bearing 6 faces the cap-like member 30 while those being properly spaced from each other, also form a labyrinth structure.

In the second embodiment shown in FIG. 6, the labyrinth structures as mentioned above prevents dust particles from scattering outside from the ball bearings. Thus, the cap-like member 30, which is used in place of the cap 10 in the first embodiment shown in FIG. 2, is capable of providing the dust scatter preventing effect comparable with that of the first embodiment.

Also in the second embodiment of FIG. 6, a labyrinth structure may be formed in which a member, such as the cylindrical part of the frame shown in FIGS. 1 and 2, is disposed in opposition to the outer surface of the outer ring of the lower ball bearing (not shown).

While the present invention is applied to the magnetic disc drive device of the shaft fixed type in the first and second embodiments, it is evident that the present invention is applicable for the magnetic disc drive device of the shaft rotating type.

3rd Embodiment

A third embodiment of a magnetic disc drive device according to a third embodiment of the present invention will be described with reference to FIG. 7.

Figure 7:
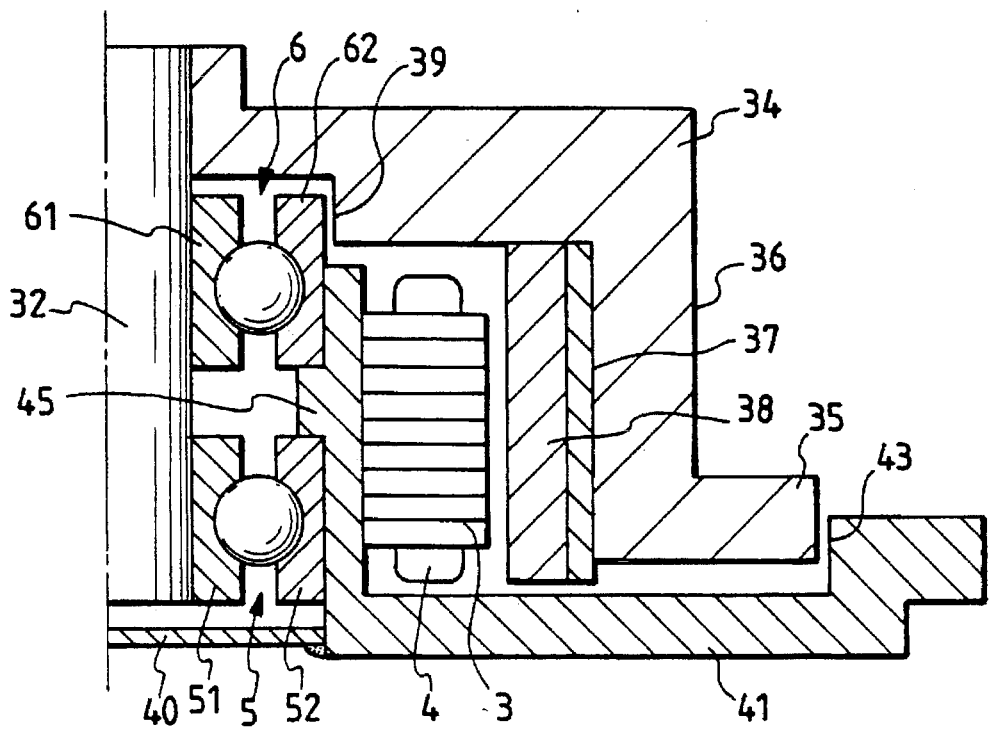
FIG. 7 is a front sectional view showing a major portion of a fifth embodiment of a magnetic disc drive device according to the present invention.

FIG. 7 is a front sectional view showing a magnetic disc drive device of the shaft rotating type according to the third embodiment of the present invention. The labyrinth structure as mentioned above is used in the magnetic disc drive device.

In FIG. 7, a frame 41 includes a bearing holder 45 formed in the central part thereof. A stator core 3 is fastened to a predetermined position on the outer surface of the bearing holder 45.

The outer rings 52 and 62 of the ball bearings 5 and 6 are forcibly put into and fixed in the bearing holder 45.

A drive coil 4 is wound, by a preset number of turns, on the protruded poles of the stator core 3.

A shaft 32 is forcibly put into and fixed to the inner rings 51 and 61 of the ball bearings 5 and 6. A hub 34 is forcibly applied to the upper part of the shaft 32 extended above the ball bearing 6, and fixed thereto. The combination of the shaft 32 and the hub 34 is rotatably supported by the frame 41. The hub 34 as a cylindrical member with the bottom closed includes an outer surface 36 and a flange part 35. When a magnetic disc is applied to the hub 34, it is moved along the outer surface 36 and sits on the flange part 35.

A drive magnet 38 is fastened to the inner surface of the hub 34 in a state that a yoke 37 is inserted therebetween. The inner surface of the drive magnet 38 faces the tip tops of the protruded poles of the stator core 3 while being properly spaced from each other.

With this structure, when current fed to the drive coil 4 is switched depending on an angular position of the drive magnet 38, the hub 34, together with the shaft 32, are turned at a predetermined speed.

The upper part of the outer ring 62 of the ball bearing 6 is extended upward from the bearing holder 45.

A cylindrical part 39, centered at the center axial line of the shaft 32, is formed in the ceiling portion of the hub 34.

The cylindrical part 39 is equivalent in function to the cap-like member 30 in the second embodiment. The cylindrical part 39 is disposed facing the outer surface of the outer ring 62 of the ball bearing 6, which is extended above the bearing holder 45. This structure forms a labyrinth structure.

The ceiling surface of the central part of the hub 34 faces the top end face of the ball bearing 6 when viewed in the axial direction, thereby forming a labyrinth structure.

The outer surface of the flange part 35 of the hub 34 faces a cylindrical surface 43 of the frame 41, thereby forming a kind of the labyrinth structure.

A cap 40 is set to the opening the bottom of the frame 41. The cap 40 is provided to prevent the dust particles from being discharged outside from the lower bearing 5.

As described above, in the magnetic disc drive device of the shaft rotating type according to the third embodiment, the labyrinth structure is formed by the cylindrical part 39 of the hub 34, and the outer surface of the outer ring 62 of the ball bearing 6. Another labyrinth structure is formed by the ceiling surface of the central part of the hub 34 and the top end face of the ball bearing 6. These labyrinth structures effectively prevent dust particles from being scattered from the ball bearings. Therefore, the magnetic disc held by the hub little receives the dust particles from the ball bearings. Thus, the construction of the third embodiment has the dust scatter preventing effect comparable with that of the first embodiment shown in FIGS. 1 and 2.

4th Embodiment

A fourth embodiment of a magnetic disc drive device according to the present invention will be described with reference to FIG. 10.

Figure 10:
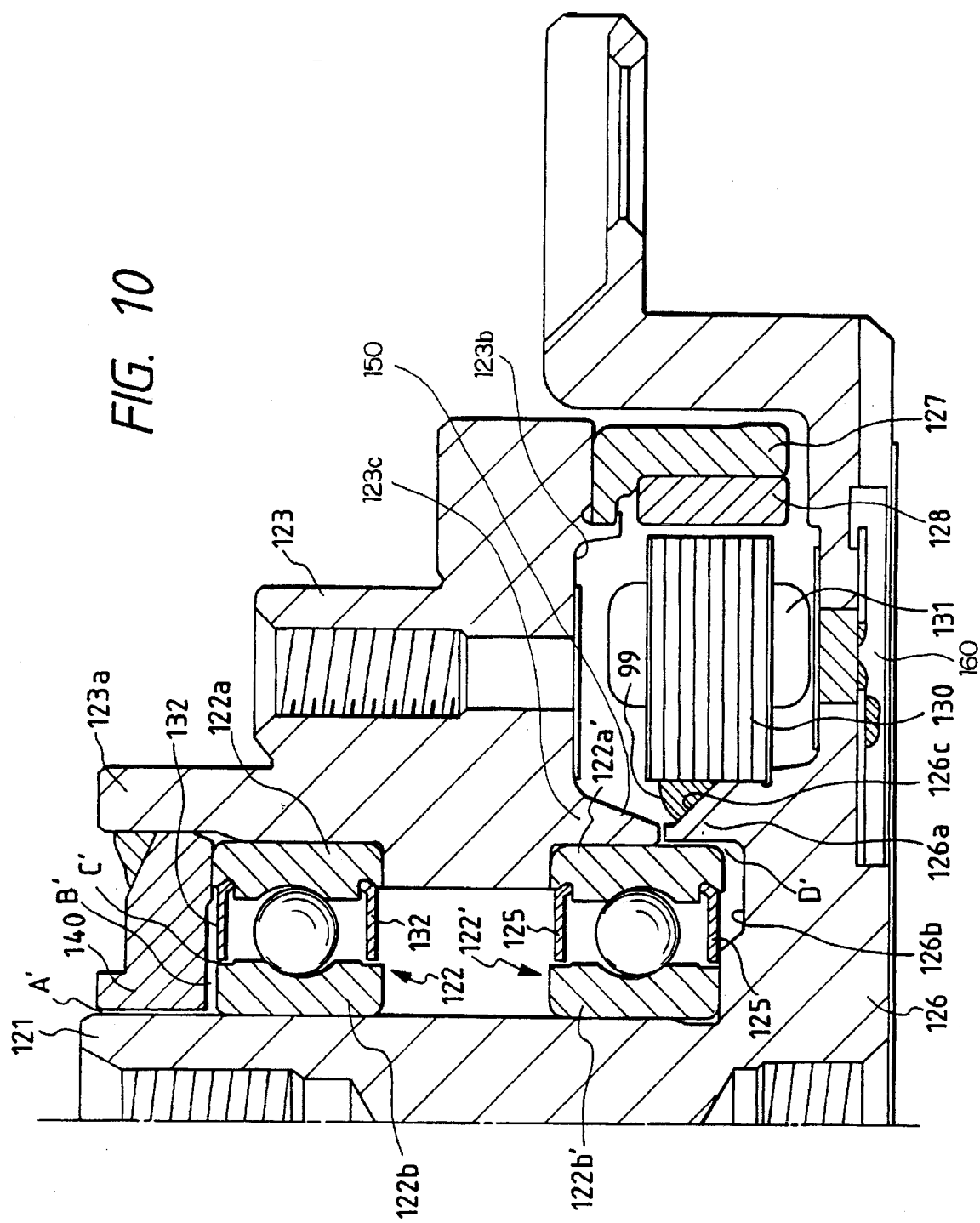
FIG. 10 is a front sectional view showing a fourth embodiment of a magnetic disc drive device according to the present invention.

In FIG. 10, reference numeral 126 designates a frame shaped like a cup. A fixed shaft 121 is erected at the central part of the frame 126.

A cylindrical part 126a is located around the fixed shaft 121. A stator core 130 is attached to the outer surface of the cylindrical part 126a.

The outer surface of the cylindrical part 126a is bevelled to form a conical shape in cross section. The conical part of the cylindrical part 126a and the inner surface of the stator core 130 cooperate to form an adhesive reservoir 126c.

A stator core 130 is fastened to the frame 126 (cylindrical part 126a) by adhesive 99 when it fills up the adhesive reservoir 126c.

The stator core 130 is formed of a plural number of laminated core elements. A plural number of poles are protruded from the outer surface of the stator core 3.

A drive coil 131 is wound, by a preset number of turns, on the protruded poles of the stator core.

The inner rings 122b and 122b' of the upper and lower ball bearings 122 and 122' are fastened to the fixed shaft 121 upstanding on the frame 126. A hub 123 is fastened to the outer rings 122a and 122a' of the ball bearings 122 and 122'.

A magnetic disc, not shown, is attached to the outer surface of the hub 123, and turned by the hub 123. The hub 123 is rotatably supported by the frame 126 and the fixed shaft 121 since the upper and lower ball bearings 122 and 122' are provided between them.

Bearing seal members 132 are attached to the top and the bottom of the ball portion of the outer ring 122a of the ball bearing 122. The gap between the inner ring and the outer ring of the ball bearing 122 in which balls are set is closed with the bearing seal members 132.

Bearing seal members 125 are attached to the top and the bottom of the ball portion of the outer ring 122a' of the ball bearing 122'. The gap between the inner ring and the outer ring of the ball bearing 122' in which balls are set is closed with the bearing seal members 125.

A cylindrical rotor case 127 is mounted on the bottom of the hub 123 by means of caulking, for example.

A drive magnet 128, shaped like a ring, is mounted on the inner surface of the rotor case 127.

The inner surface of the drive magnet 128 faces the stator core 130 while being properly spaced. With this structure, when current fed to the drive coil 131 is properly controlled, so that the drive magnet 128 is energized in the circumferential direction and the hub 123 is turned.

A sealing means 140, shaped like a ring, is fastened to the fixed shaft 121 above the ball bearing 122.

The sealing means 140 is disposed between the fixed shaft 121 and the inner surface of a cylindrical part 123a extended from the top end of the hub 123, while being fastened to the inner surface of the cylindrical part 123a.

The lower end face of the sealing means 140, which is located closer to the hub 123, is in contact with the upper end face of the outer ring 122a of the ball bearing 122.

A gap A' is present between the outer surface of the sealing means 140 and the outer surface of the fixed shaft 121.

A gap B' is also present between the lower end face of the sealing means 140 and the upper surfaces of the bearing seal members 132 and the ball bearing 122.

Since the bearing seal members 132 is mounted on the ball bearing 122, a gap C' is present between the inner surface of the bearing seal members 132 and the inner ring 122b of the ball bearing 122.

The gaps A', B' and C' connect to the space of the ball portion of the ball bearing 122. These gaps form a complicatedly bent passage, thereby forming a labyrinth structure.

The labyrinth structure partitions the inner space (referred to as a bearing contained space) containing the upper and lower ball bearings 122 and 122' from the outside space of the magnetic disc drive device.

Dust generated in the ball portion of the ball bearing 122 is confined within the bearing contained space, and hence is not scattered into the space in which the magnetic disc is disposed.

A portion in the vicinity of the outer ring 122a' of the lower ball bearing 122' forms a labyrinth structure as in the first embodiment.

A gap D' is present between the inner surface of the cylindrical part 126a of the frame 126 and the outer surface of the ball lower bearing 122', thereby forming a labyrinth structure.

The gap D' communicates with a lowered portion 126b of the frame 126, which is located under the outer ring 122a' of the ball bearing 122'. This structure forms a labyrinth structure.

By the labyrinth structure including the gap D', dust particles, such as oil mist, generated in the ball portion of the ball bearing 122', are prevented from flowing from the lowered portion 126b to the space where the stator core 130 is disposed.

Since the bearing seal members 125 is mounted on the outer ring 122a' of the ball bearing 122', a gap is also present between the inner surface of the bearing seal members 125 and the inner ring 122b' of the ball bearing 122'.

An extended part 123c with a face 150 tapered apart from the drive coil 131 is extended from the inner circumferential edge continuous to the bottom face 123b of the hub 123, which faces the upper surface of the drive coil 131.

The outer ring 122a' of the lower ball bearing 122' is forcibly applied and fixed to the inner surface of the fixed shaft 121 of the extended part 123c.

The tapered face 150 is tapered apart from the drive coil 131, so that it does not come in contact with the drive coil 131.

A lead wire 160 of the drive coil 131 is led out through a hole of the bottom of the frame 126 and connected to a connector through a flexible board.

In the fourth embodiment shown in FIG. 10, the surface 150 of the extended part 123c, which is extended from the inner circumferential edge of the bottom of the hub 123, and fronts toward the drive coil 131, and is provided for receiving the outer ring 122a' of the lower ball bearing 122', is tapered apart from the drive coil 131. The extended part 123c with the tapered face 150 firmly supports the lower ball bearing 122' and the hub 123 never comes in contact with the drive coil 131. The tapered face 150 may be formed merely by a forging process. In other words, there is no need of a process of cutting or lacing a portion of the hub 123 in the vicinity of the drive coil 131. The hub can be worked efficiently and at low cost.

In the fourth embodiment, the forging process is used for forming the tapered face of the bottom of the hub. A casting process or any other suitable process may be used in place of the forging process.

The material of the hub may be aluminum or the like.

5th Embodiment

A fifth embodiment of a magnetic disc drive device according to the present invention will be described with reference to FIG. 11.

Figure 11:
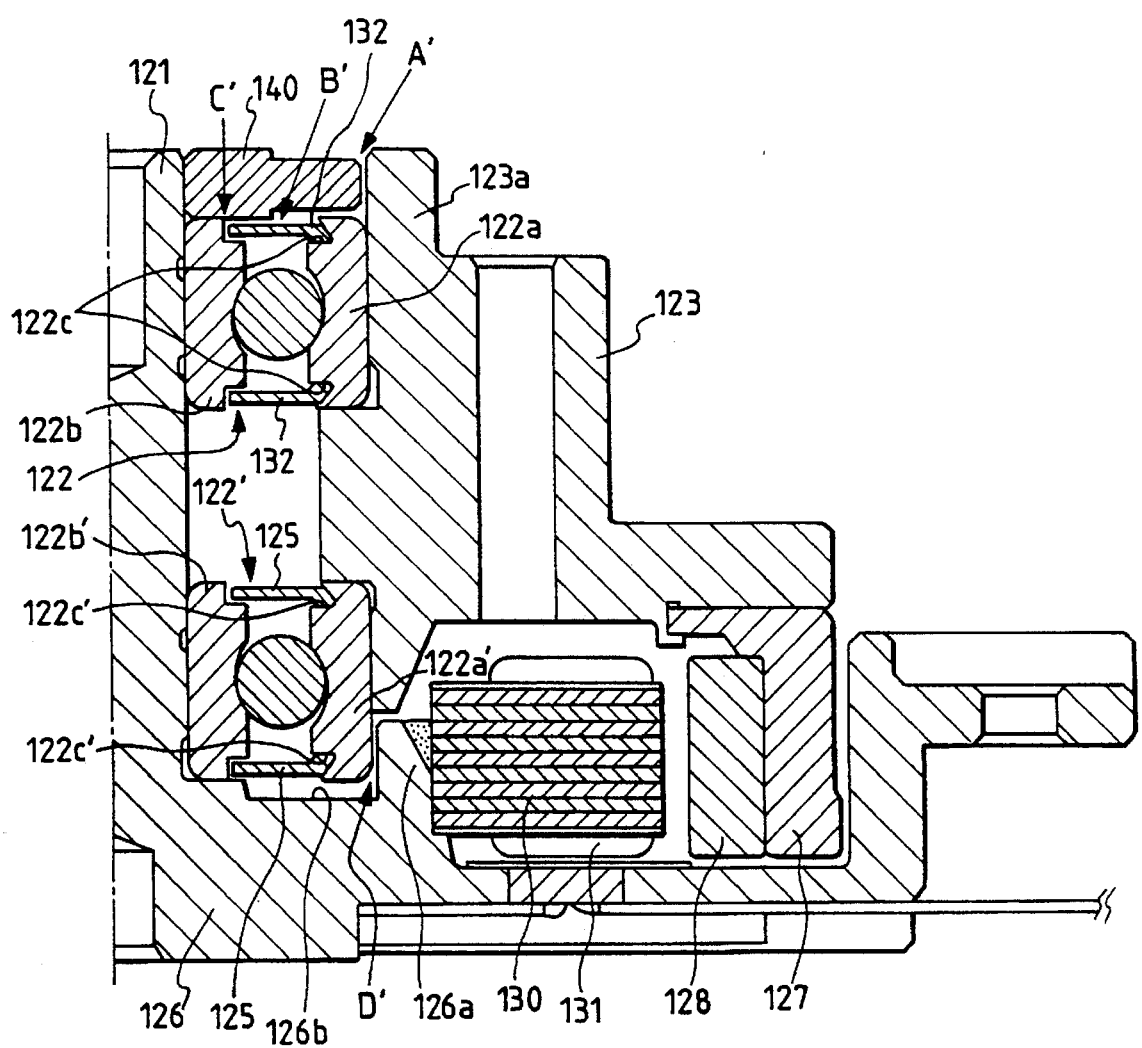
FIG. 11 is a front sectional view showing a fifth embodiment of a magnetic disc drive device according to the present invention.

The fifth embodiment shown in FIG. 11 is different from the fourth embodiment in that a ring-like sealing means 140 is fastened to the flange portion 121. Description will be given placing an emphasis on this difference.

Like or equivalent portions are designated by like reference numeral in the fourth embodiment.

A ring-like sealing means 140 is mounted on the fixed shaft 121 above the upper ball bearing 122.

The sealing means 140 is secured to the outer surface of the fixed shaft 121, while being disposed between the fixed shaft 121 and the inner surface of the cylindrical part 123a of the upper part of the hub 123.

A part of the lower side of the sealing means 140, which fronts on the fixed shaft 121, is in contact with the upper surface of the inner ring 122b.

A gap A' is present between the surface of the sealing means 140 and the inner surface of the hub 123.

Another gap B' is present between the lower side of the sealing means 140 and the upper surfaces of the bearing seal member 132 and the outer ring 122a of the upper ball bearing 122.

Since the bearing seal members 132 is mounted on the upper ball bearing 122, an additional gap C' is present between the inner surface of the bearing seal members 132 and the inner ring 122b of the upper ball bearing 122.

The gaps A', B' and C' connect to the space of the ball portion of the upper ball bearing 122. These gaps form a complicatedly bent passage, thereby forming a labyrinth structure. With this labyrinth structure, dust generated in the ball portion of the ball bearing 122 is confined within the bearing contained section, and hence is not scattered into the space in which the magnetic disc is disposed.

6th Embodiment

A sixth embodiment of a magnetic disc drive device according to the present invention will be described with reference to FIG. 12.

Figure 12:
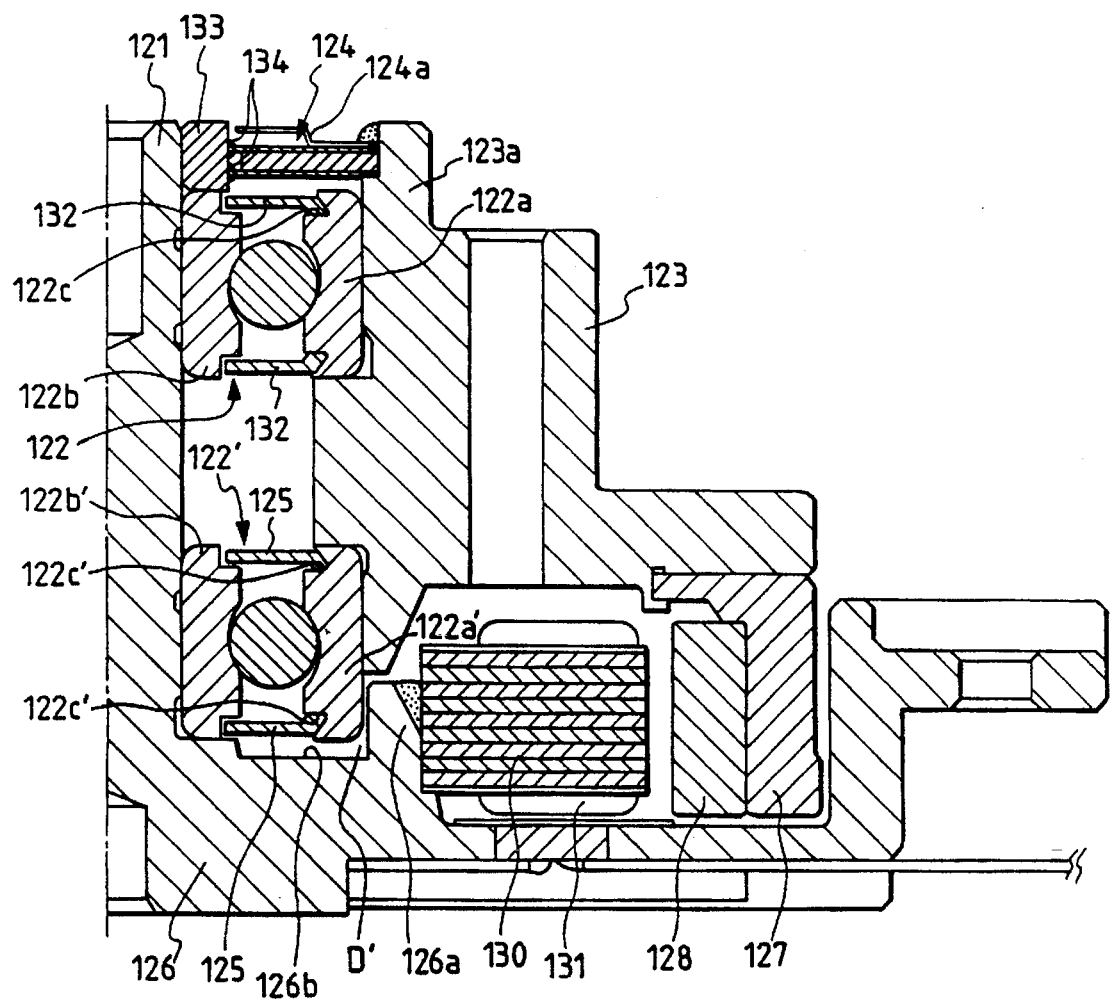
FIG. 12 is a front sectional view showing a sixth embodiment of a magnetic disc drive device according to the present invention.

The sixth embodiment shown in FIG. 12 is substantially the same as the fourth embodiment or the fifth embodiment except that a magnetic seal 124, a magnetic ring 133 and a magnetic fluid 134 are used, not using the sealing means 140. Description of the sixth embodiment will be given placing an emphasis on the difference.

The construction of the sixth embodiment except the construction including the magnetic seal 124, the magnetic ring 133 and the magnetic fluid 134 is substantially the same as that of the third embodiment or the fourth embodiment. Accordingly, like reference numerals are used for designating like or equivalent portions in the latter embodiments, for simplicity.

In FIG. 12, the magnetic ring 133 is mounted on the fixed shaft 121 above the upper ball bearing 122.

The cylindrical part 123a is extended from the top end of the hub 123. A ring-like magnetic seal 124 is disposed within the cylindrical part 123a in a state that the former is fastened at a point on the outer surface thereof to the inner surface of the cylindrical part 123a.

The magnetic fluid 134 is present in a space between the magnetic seal 124 and the magnetic ring 133.

The combination of the magnetic seal 124, the magnetic ring 133 and the magnetic fluid 134 partitions the bearing contained space from the outside space.

With this structure, dust particles, such as oil mist, generated in the upper ball bearings 122, are prevented from being scattered outside.

The magnetic seal 124 is rotatable with respect to the magnetic ring 133 since the magnetic fluid 134 is used. Then, the hub 123 is rotatable about the fixed shaft 121. A seal cover 124a is applied to the magnetic seal 124 within the cylindrical part 123a of the hub 123.

7th Embodiment

A seventh embodiment of a magnetic disc drive device according to the present invention will be described with reference to the accompanying drawings.

In the fifth embodiment shown in FIG. 11, the bearing seal members 132 are mounted on the top and the bottom of the ball portion of the outer ring 122a of the upper ball bearing 122. The space between the inner ring and the outer ring of the upper ball bearing 122 in which a ball is set, is closed by the bearing seal members 132.

In the seventh embodiment, the bearing seal members 132 is made of rubber.

Upper and lower grooves 122c are formed in the inner surface of the outer ring 122a of the upper ball bearing 122. The rubber bearing seal members 132 are inserted into the grooves 122c in a radially compressed fashion.

The rubber bearing seal members 132, when set, are extended toward the inner ring 122b, thereby to cover the upper side and the lower side of the ball held by the outer ring 122a and the inner ring 122b.

Similarly, the upper and lower bearing seal members 125 made of rubber are firmly attached to the outer ring 122a' of the lower ball bearing 122' The upper and lower gaps of the ball portion, which is defined by the outer ring 122a' and the inner rings 122b' and contains a ball therein, are closed by the bearing seal members 125.

Upper and lower grooves 122c' are formed in the inner surface of the outer ring 122a' of the lower ball bearing 122' The rubber bearing seal members 125 are inserted into the grooves 122c' in a radially compressed fashion.

The rubber bearing seal members 125, when set, are extended toward the inner ring 122b', thereby to cover the upper side and the lower side of the ball held by the outer ring 122a' and the inner ring 122b'.

Thus, the bearing seal members 132 are inserted into the upper and lower grooves 122c in a compressed fashion. After inserted into the grooves, the bearing seal members 132 will restore to their original state by its elasticity, to thereby fill up the grooves.

In other words, the bearing seal members 132 are airtightly set in the grooves, eliminating any space therebetween.

When the upper ball bearing 122 is turned and the dust particles are deviated to the outer ring 122a within the upper ball bearing 122 by a centrifugal force generated, this sealing structure including the bearing seal members 132 and the grooves 122c reliably confine the dust particles within the bearing contained space. No dust particles pass through the gap A' and go to the magnetic disc.

The dust particles thus confined within the upper ball bearing 122 will move through the gap C' between the inner side of the bearing seal members 132 and the inner ring 122b. However, the movement of the dust particles is blocked by the labyrinth structure including the gaps A' to C'.

The quantities of dust particles to be scattered to outside the bearing contained space were measured. Two types of the magnetic disc drive devices were used; a first magnetic disc drive device in which the bearing seal members was made of iron, and a second magnetic disc drive device (seventh embodiment) in which it was made of rubber.

The magnetic disc drive devices have both such a construction that the ring-like sealing means 140 is attached to the top of the fixed shaft 121, as shown in FIG. 11.

The upper and the lower ball bearings 122 and 122' have labyrinth structures.

The upper and the lower bearing seal members 125 are attached to the outer ring 122a' of the lower ball bearing 122'.

In the first magnetic disc drive device, the bearing seal members 132 made of iron is attached to the upper ball bearing 122, while in the second magnetic disc drive device, the bearing seal members 132 made of rubber are attached to the grooves 122c of the outer ring 122a of the upper ball bearing 122 in a compressed fashion.

Four number of the first magnetic disc drive devices and four number of the second magnetic disc drive devices were used for the measurements. The magnetic disc drive devices were operated for ten minutes in a closed space. In this state, air is sucked from the closed space, and the numbers of dust particles of 0.1 µm, 0.3 µm and 0.5 µm in particle sizes were measured for the intervals of one minute.

The results of the measurements are shown in FIG. 13.

As seen from FIG. 13, the measured numbers of dust particles of 0.5 µm, which are discharged from the first and second magnetic disc drive devices, are small and the difference of them is not so much.

The measured numbers of the dust particles of 0.1 μm and 0.3 μm, smaller than the above, which are discharged from the second magnetic disc drive devices using the rubber bearing seal members, are much smaller than those of the dust particles discharged from the first magnetic disc drive devices using the iron bearing seal members. From this fact, it is seen that the rubber bearing seal members 132 compressively attached to the outer ring 122a can effectively shut off the flow of dust particles from the bearing contained space to the outside thereof. Further, use of the rubber bearing seal members thus attached eliminates the necessity of the expensive members, such as the magnetic fluid seals. This leads to the reduction of cost to manufacture.

8th Embodiment

An eighth embodiment of a magnetic disc drive device according to the present invention will be described with reference to the accompanying drawings.

The eighth embodiment of the present invention improves the structure including the gap between the outer ring of the lower ball bearing and the cylindrical part of the frame in each of the first to seventh embodiments.

Hence, the description to follow will be given only this gap formed in the vicinity of the lower ball bearings.

In FIG. 1 showing the first embodiment, the gap G is present between the inner surface of the cylindrical part 12 of the base 1a and the outer surface of the outer ring 52 of the lower bearing 5. The gap G communicates with the lowered portion of the base 1a of the frame 1 located under the lower bearing 5, to thereby form a labyrinth structure.

The labyrinth structure including the gap G shuts off the flow of the dust generated in the ball portion of the lower bearing 5 to the outside space where the stator core 3 is disposed.

The magnetic disc drive device using the labyrinth structure exhibits a sufficient dust confining effect when it operates at low speed.

When the magnetic disc drive device operates at high speed, e.g., 4500 rpm or higher, the labyrinth structure unsatisfactorily functions frequently. In this case, it cannot satisfactorily stop the flow of the dust particles into the outside space where the stator core 3 is located.

To cope with this problem, the eighth embodiment of the present invention provides a magnetic disc drive device which can have a satisfactory dust confining effect even when the device operates at high speed.

Figure 14:
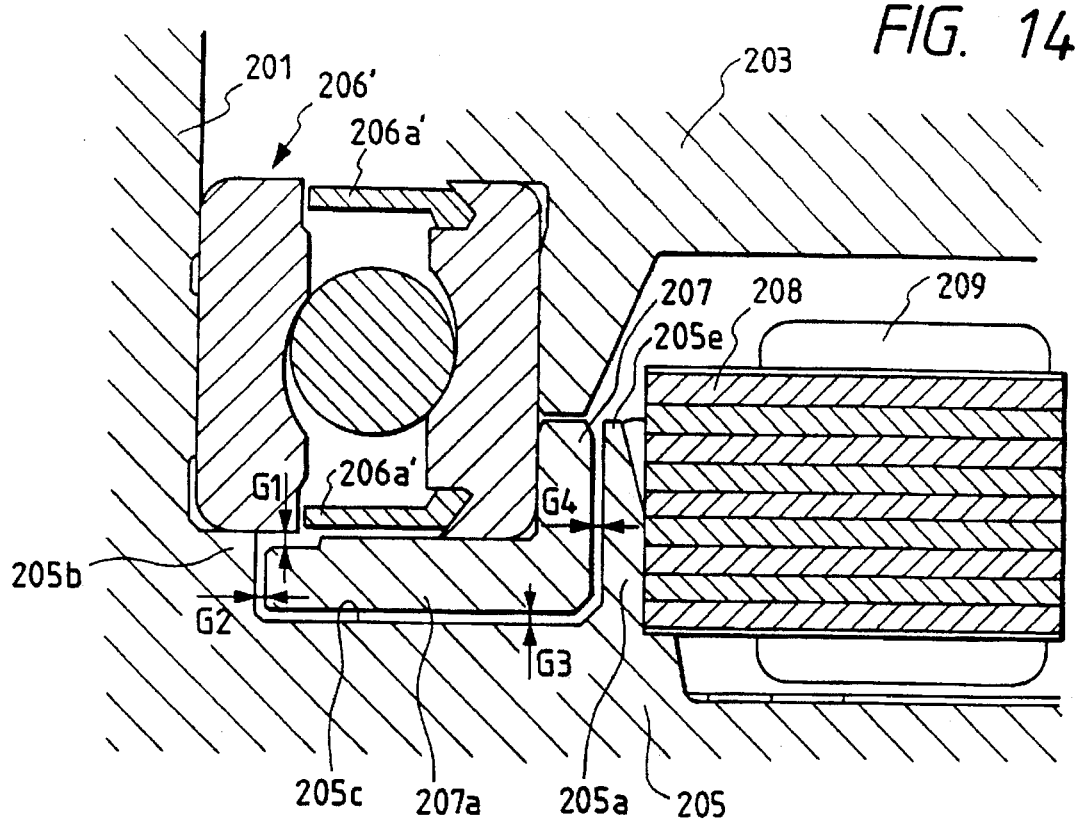
FIG. 14 is a front sectional view showing a major portion of an eighth embodiment of a magnetic disc drive device according to the present invention.

In FIG. 14 showing the eighth embodiment of the invention, a cylindrical part 205a is upright on the bottom of a frame 205, while surrounding a fixed shaft 201. The upper outer surface of the cylindrical part 205a is tapered.

A stator core 208 is mounted on the outer surface of the cylindrical part 205a.

An adhesive reservoir 205e is formed by the inner surface of the stator core 208 and the tapered face of the cylindrical part 205a with the stator core 208 mounted thereon. The stator core 208 is fastened to the cylindrical part 205a by adhesive when it fills up the adhesive reservoir 205e.

The stator core 208 is formed of a plural number of laminated core elements. A plural number of poles are protruded from the outer surface of the stator core 208.

A drive coil 209 is wound, by a preset number of turns, on the protruded poles of the stator core 208.

The inner ring of the lower ball bearing 206' is fastened to the fixed shaft 201.

The lower end face of the inner ring of the lower ball bearing 206' sits on a step 205b formed in the root of the fixed shaft 201.

The outer ring of the lower ball bearing 206' is inserted into and fastened to the center hole of the hub 203 on which a magnetic disc is set.

The hub 203 is rotatably supported by the frame 205 and the fixed shaft 201, with the lower ball bearing 206' intervening therebetween.

The upper and lower bearing seal members 205a' are attached to the outer ring of the lower ball bearing 206'. These seal members extend toward the inner ring and cover the spaces between the inner ring and the outer ring.

A labyrinth ring 207, shaped like L in cross section, is fastened to the outer ring, of the lower ball bearing 206'. The labyrinth ring 207 extends over the lower part of the outer ring of ball bearing 206.

The bottom portion 207a of the labyrinth ring 207, which extends toward the step 205b of the frame 205, covers the lower end surface of the lower ball bearing 206', the bearing seal member 205a', and a part of the inner ring of the lower ball bearing 206'.

The bottom portion 207a is separated from the bottom of a lowered portion 205c which is formed between the cylindrical part 205a of the frame 205 and the step 205b.

A gap G2 is present between the distal end of the bottom portion 207a and the side wall of the lowered portion 205c, as shown in FIG. 14.

Another gap G3 is present between the lower side of the bottom portion 207a and the bottom of the lowered portion 205c.

An additional gap G4 is present between the outer surface of the labyrinth ring 207 and the outer surface of the lowered portion 205c.

A further gap G1 is present between a part of the upper end face of the bottom portion 207a and the lower end of the inner ring of the lower ball bearing 206'.

The gaps G1, G2, G3, and G4 form a complicatedly bent passage, thereby forming a labyrinth structure.

The ball portion of the lower ball bearing 206' communicate with the gap G1 through the gaps, which are present between the bearing seal members 205a' and the inner ring of the lower ball bearing 206'.

With this passage, dust particles generated in the ball portion enter the gap G1. However, a further movement of the dust particles is shut off by the labyrinth structure including the gaps G1, G2, G3 and G4, so that no dust particles reach the space containing the stator core 208.

In the magnetic disc drive device thus constructed, the labyrinth ring 207, shaped like L in cross section, is fastened to the outer ring of the lower ball bearing 206'. With use of the labyrinth ring thus arranged, gaps, which are formed by the inner surface, the outer surface and the lower end face of the labyrinth ring 207, and the end faces of the lowered portion 205c of the frame 205, form the complicated bent passage, which provides the labyrinth structure.

This labyrinth structure stops the movement of dust particles generated in the ball portion of the lower ball bearing 206' toward the outside space (containing the stator core 208). The labyrinth structure constructed by the labyrinth ring 207 attached to the lower ball bearing 206' is more complicated than that of the first embodiment.

Accordingly, the dust shut-off effect of the labyrinth structure of the eighth embodiment is further improved, so that the dust particles are reliably shut off over a wide range from low rotation speed of the magnetic disc drive device to high rotation speed in excess of 4,500 rpm.

In the eighth embodiment, the labyrinth ring 207 is attached to the lower ball bearing 206', but it may be attached to any other suitable member or place.

In the first embodiment, the labyrinth ring may be attached to the upper ball bearing, to thereby form a labyrinth structure. If required, the labyrinth rings may be attached to the upper and the lower ball bearings.

In the magnetic disc drive device thus constructed, the labyrinth structure including the gaps formed by the labyrinth ring 207 and the lowered portion 205c of the frame 205 is capable of effectively shutting off the flow of dust particles toward the outside space. Therefore, low grade ball bearings not having the bearing seal members may be used.

Accordingly, when such low grade ball bearings are used, the manufacturing cost can be reduced.

9th Embodiment

A ninth embodiment of a magnetic disc drive device according to the present invention will be described with reference to the accompanying drawings.

The ninth embodiment further enhances the labyrinth effects when comparing with the eighth embodiment.

Figure 15:
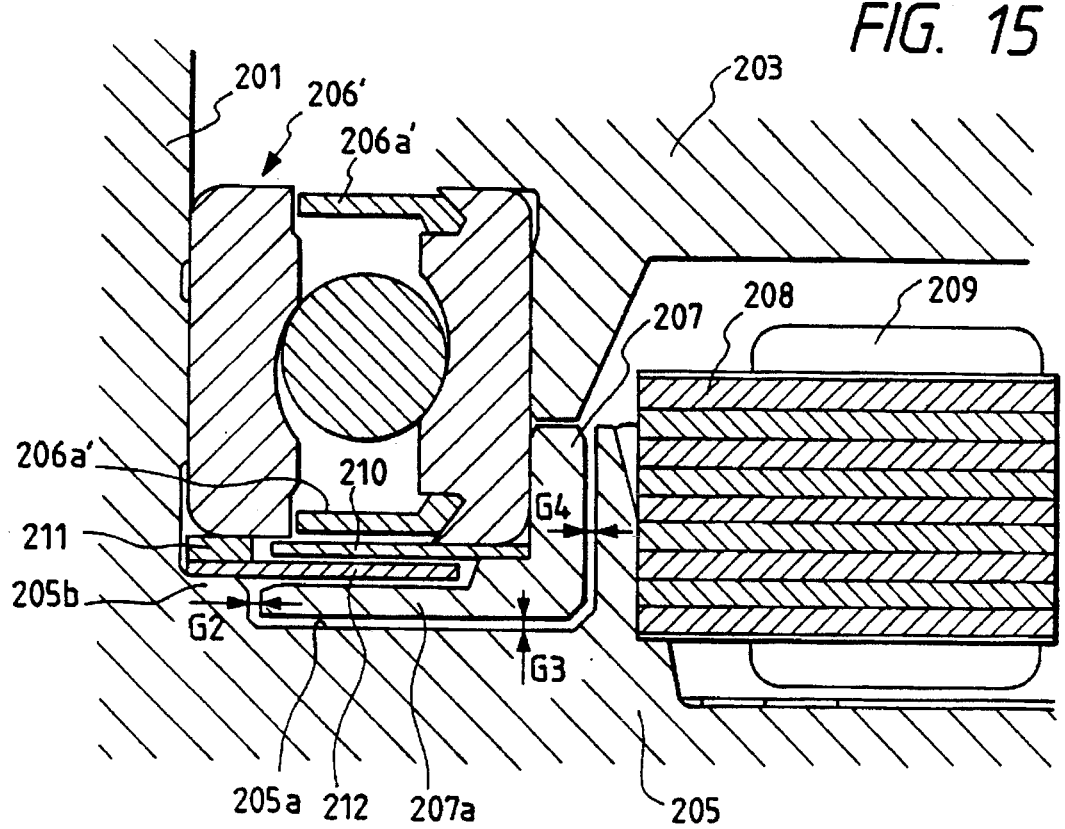
FIG. 15 is a front sectional view showing a major portion of a ninth embodiment of a magnetic disc drive device according to the present invention.

The ninth embodiment shown in FIG. 15 is equivalent to the eighth embodiment shown in FIG. 14 additional using a first ring plate 210 and a second ring plate 212.

As shown in FIG. 15, the first ring plate 210 is provided between the outer ring of the lower ball bearing 206' and the labyrinth ring 207.

The second ring plate 212 is provided between the lower side of the inner ring of the lower ball bearing 206' and the upper surface of the step 205b, in a state that a spacer 211 is inserted between the ring plate 212 and the lower side of the inner ring.

With such a structure, gaps are formed between the first ring plate 210 and the lower side of the inner ring of the lower ball bearing 206', the first ring plate 210 and the second ring plate 212, and the second ring plate 212 and the bottom portion 207a.

In this embodiment, the first and second ring plates 210 and 212 are used. Because of this, the number of the gaps used is increased by one when comparing with that in the eighth embodiment. Further, the passage formed by the gaps is more complicatedly bent to form a more effective labyrinth structure. This labyrinth structure more effectively shuts off the flow of dust particles toward the outside space.

The gap between the bottom portion 207a of the labyrinth ring 207 and the spacer 211, and the gap between the first ring plate 210 and the second ring plate 212 are preferably 0.2 mm or shorter.

The gap between the lower end face of the bottom portion 207a and the bottom of the lowered portion 205c is preferably 0.1 mm or shorter. The gap between the inner surface of the labyrinth ring 207 and the side wall of the lowered portion 205c is preferably 0.5 mm or shorter.

This labyrinth structure thus constructed and specified provides a satisfactory dust confining effect.

When the first and the second ring plates 210 and 212 are used, the gap between the lower end face of the lower ball bearing 206' and the first ring plate 210, the gap between the first and the second ring plates 210 and 212, and the gap between the second ring plate 212 and the bottom portion 207a cooperate to form a labyrinth structure having a satisfactory dust sealing structure. Accordingly, the gap between the lower side of the bottom portion 207a and the bottom of the lowered portion 205c may be omitted.

As seen from the foregoing description, a member (referred to as an opposed member) is disposed facing the outer surface of the outer ring of a ball bearing in a state that a gap is present therebetween. The gap forms a complicatedly bent passage in the middle of the space, thereby forming a labyrinth structure. When the ball bearing is turned together with the hub, a negative pressure is created in the passage of the labyrinth structure. In this state, the labyrinth structure serves as an air curtain for effectively preventing dust particles, such as oil mist, generated in the ball bearing, from being scattered. The number of dust particles scattered to stick to the magnetic disc is remarkably reduced. The outer surface of the ball bearing is finished with a high precision from the first. Accordingly, high precision machining is required for only the inner surface of the member, which faces the outer surface of the ball bearing. As a result, the machining cost is reduced.

In the present invention, a part of the opposed member is disposed facing the end face of the ball bearing as viewed in the axial direction or the seal member in a state that a gap is present therebetween. The scattering of dust particles can effectively be prevented.

The cylindrical part of the frame or the hub is used as the opposed member. There is no need of using additional separate parts for the opposed member. Accordingly, the number of required parts can be reduced.

The adhesive reservoir is formed between the inner surface of the stator core fit and fixed to the base of the frame and the outer surface of the cylindrical part. The outer surface of the cylindrical part for the adhesive reservoir has the straight part raised in the axial direction. The straight part blocks overflown adhesive from moving to attach to the ball bearing and the hub.

The rubber seal members are compressively attached to the inner side of the outer ring of the ball bearing. A part of each rubber seal members, after attached, will restore to its original state by its elasticity. Accordingly, an airtight attachment of the seal member is ensured. The generated dust particles are confined within the ball bearing. In other words, the dust particles generated in the ball bearing are prevented from being scattered outside in an inexpensive manner.

What is claimed is:

1. A magnetic disc drive device comprising:

a shaft;

a frame;

a stator core arranged on said frame;

a hub arranged about said shaft;

a ball bearing, having an inner ring and an outer ring, for rotatably supporting the hub, said inner ring of the ball bearing being fixed on said shaft; and an opposed member, having an inner surface arranged to face an outer surface of said outer ring of the ball bearing, a gap being formed between said outer surface of said outer ring and said inner surface of said opposed member, the gap being defined in a passage connecting the inside of the ball bearing to the outside thereof, wherein said opposed member, the gap and said outer ring form a labyrinth structure.

2. The magnetic disc drive device according to claim 1, further comprising a bearing seal member secured to said inner surface of said outer ring and extending in a radial direction, wherein a part of the opposed member faces a lower end face of said outer ring of the ball bearing and the bearing seal member in the axial direction in such a manner that a second gap is formed therebetween to form another labyrinth structure.

3. The magnetic disc drive device according to claim 2, wherein said bearing seal member comprises a rubber bearing seal.

4. The magnetic disc drive device according to claim 1, wherein the opposed member corresponds to a cylindrical part of the frame.

5. The magnetic disk drive device according to claim 4, wherein an adhesive reservoir is formed between an inner surface of the stator core and the outer surface of the cylindrical part of the frame.

6. The magnetic disc drive device according to claim 1, further comprising:

a seal member, having an inner surface, an outer surface and a lower end face, fastened to an inner surface of the hub, wherein the lower end face of the seal member is spaced apart from and faces an upper end face of the ball bearing, the inner surface of the seal member is spaced apart from and faces an outer surface of the shaft.

7. The magnetic disc drive device according to claim 1, further comprising:

a seal member, having an inner side, an outer side and a lower end face, fastened to one of the ends of the shaft, wherein the lower end face of the seal member is spaced apart from and faces an upper end face of the ball bearing, the outer side of the seal member is spaced apart from said hub and faces an inner surface of the hub.

8. A magnetic disc drive device comprising:

a shaft;

a frame;

a hub arranged about said shaft;

a ball bearing, having an inner ring and an outer ring, for rotatably supporting said hub;

an opposed member having an inner surface arranged to face an outer surface of said outer ring of said ball bearing, a labyrinth ring, shaped like an L in cross section and having an upper side, a lower side and an outer side, fastened to the outer ring of the ball bearing and coming into contact with a portion of a lower end face of the outer ring, wherein a first gap is defined between the lower side of the labyrinth ring and the frame, and a second gap is defined between the outer side of the labyrinth ring and the opposed member to form a labyrinth structure.

9. The magnetic disc drive device according to claim 8, wherein the upper side of the labyrinth ring is arranged to face a lower end face of the inner ring of the ball bearing, said upper side of the labyrinth ring being separated from said inner ring by a predetermined distance.

10. A magnetic disc drive device comprising:

a shaft;

a frame;

a hub arranged about said shaft;

a first ball bearing, having an inner ring and an outer ring, for rotatably supporting said hub;

a seal member, having an inner surface, an outer surface and a lower end face, fastened to an inner surface of the hub, wherein the lower end face of the seal member is spaced apart from and faces an upper end face of the ball bearing, the inner surface of the ring-like seal member is spaced apart from and faces an outer surface of the shaft a second ball bearing, having an inner ring and an outer ring, for rotatably supporting said hub;

an opposed member having an inner surface arranged to face an outer surface of said outer ring of said second ball bearing, a labyrinth ring, shaped like an L in cross section and having a lower side and an outer side, fastened to the outer ring of the second ball bearing, wherein a first gap is defined between the lower side of the labyrinth ring and the frame, and a second gap is defined between the outer side of the labyrinth ring and the opposed member to form a labyrinth structure.

11. A magnetic disc drive device comprising:

a shaft;

a frame;

a hub arranged about said shaft;

a first ball bearing, having an inner ring and an outer ring, for rotatably supporting said hub;

a seal member, having an inner surface, an outer surface and a lower end face, fastened to one end of the shaft, wherein the lower end face of the seal member is spaced apart from and faces an upper end face of the ball bearing, the outer surface of the ring-like seal member is spaced apart from and faces an inner surface of the hub, a second ball bearing, having an inner ring and an outer ring, for rotatably supporting said hub;

an opposed member having an inner surface arranged to face an outer surface of said outer ring of said second ball bearing, a labyrinth ring, shaped like an L in cross section and having a lower side and an outer side, fastened to the outer ring of the second ball bearing, wherein a first gap is defined between the lower side of the labyrinth ring and the frame, and a second gap is defined between the outer side of the labyrinth ring and the opposed member to form a labyrinth structure.

12. A magnetic disc drive device comprising:

a shaft;

a frame;

a hub arranged about said shaft;

a ball bearing, having an inner ring and an outer ring, for rotatably supporting said hub;

an opposed member having an inner surface arranged to face an outer surface of said outer ring of said ball bearing, a labyrinth ring, shaped like an L in cross section and having an upper surface and a lower surface, fastened to the outer ring of the ball bearing, a first ring plate disposed between the outer ring of the ball bearing and the upper side of the labyrinth ring; and a second ring plate disposed between the frame and the inner ring of the ball bearing, wherein a first gap is defined between the first ring plate and the second-ring plate and a second gap is defined between the second ring plate and the upper surface of the labyrinth ring to form a labyrinth structure.

13. The magnetic disc drive device according to claim 12, wherein the first ring plate faces an end face of the inner ring of the ball bearing, the first ring plate being separated from said end face of the inner ring by a predetermined distance.

14. The magnetic disc drive device according to claim 12, wherein a third gap is defined between said lower surface of said labyrinth ring and said inner surface of said opposed member, and a fourth gap is defined between an outer surface of said labyrinth ring and said inner surface of said opposed member.

15. A magnetic disc drive device comprising:

a shaft;

a frame;

a hub arranged about said shaft;

a ball bearing, having an inner ring and an outer ring, for rotatably supporting said hub, said inner ring of said ball bearing being fixed onto said shaft;

a cap-like member extending from said shaft in a radial direction above said ball bearing;

a seal member secured to an inner surface of said outer ring, said seal member extending in a radial direction, said cap-like member having a portion extending parallel to an outer surface of said outer ring, perpendicular to the radial direction; and a cylindrical member secured to said outer surface of said outer ring, a portion of said cylindrical member being separated from said outer surface by a predetermined distance to form a groove;

said portion of said cap-like member extending into said groove, wherein a first gap is formed between said portion of said cap-like member and inner surfaces of said groove, and a second gap is formed between said cap-like member and said upper end face of said ball bearing, wherein said cap-like member, said portion of said cap-like member, said cylindrical member, said first gap and said second gap form a labyrinth structure.

16. The magnetic disc device according to claim 15, wherein said cylindrical member is an integral part of the hub.

* * * * *